United States Patent Office 3,674,566
Patented July 4, 1972

3,674,566
RESERVE BATTERY HAVING THE ELECTROLYTE COMPARTMENT MOVED BY GAS PRESSURE
Gerald P. Powers, North Wales, Pa., assignor to Honeywell Inc., Minneapolis, Minn.
Filed Nov. 19, 1970, Ser. No. 90,950
Int. Cl. H01m 21/00
U.S. Cl. 136—114                        10 Claims

ABSTRACT OF THE DISCLOSURE

An improved activator mechanism for a reserve electrochemical battery. The battery is comprised of an electrolyte compartment and a battery compartment separated from the electrolyte compartment by a frangible diaphragm. To activate the battery, the diaphragm, separating the two compartments, is perforated, allowing electrolyte liquid to flow from the electrolyte compartment into the battery compartment. The electrolyte compartment is divided into two parts by a movable partition. The portion of the compartment between the movable partition and the frangible diaphragm is filled with a liquid electrolyte. The other portion of the compartment on the other side of the movable partition is filled with a gas under pressure. A small amount of electrolyte liquid is also placed on the gas pressure side of the movable partition to equalize and cancel the effect of the vapor pressure of the electrolyte solvent on battery activation.

BACKGROUND OF THE INVENTION

Field of the invention

A deferred-action type of primary battery wherein prior to activation the action of the battery is prevented by a frangible diaphragm separating the battery cells from the electrolyte or the electrolyte solvent.

Description of the prior art

Numerous publications and patents show deferred-action type batteries wherein activation is achieved by breaking a seal which separates the electrolyte from the electrodes. Representative of such are Pats. 3,239,385 and 3,514,339. The first of the above patents shows an embodiment in which a lance-type initiating mechanism is used for the activation. The lance is mounted within a collapsible cup, which prior to activation is filled with a liquid. The lance is mounted in such a way that, upon compression of the cup, it is forced through the diaphragm which is located in a position to close a passage between the cup and the battery compartment. To activate the battery, the diaphragm is pierced by the lance and upon further compression of the cup the lance is forced into a central column of the battery, at the same time forcing the liquid from the cup into the battery compartment.

Pat. 3,514,339 discloses an activation mechanism wherein a frangible diaphragm, separating the battery compartment from the electrolyte compartment is broken by an activation ball which is propelled into the diaphragm by an explosive charge. The advantage of this arrangement over that of Pat. 3,239,385 is that it eliminates the lance which is often the cause of excessive short circuit currents between the individual cells in the cell stack. The disadvantage of this arrangement, on the other hand, is that it does not provide the positive transfer of the electrolyte, such as by compression by a collapsible cup, and is therefore orientation sensitive.

The present invention combines the advantages of these two embodiments and has several additional advantages which will be clear from the following specification.

SUMMARY OF THE INVENTION

The invention described herein pertains to reserve activated batteries. Particularly the present invention pertains to the type of reserve batteries wherein the electrolyte liquid is separated from other elements of the battery prior to activation. The term "battery," as used in this specification, may mean either a single current producing cell or a plurality of current producing cells arranged in series or in parallel, as the requirement of a particular situation may dictate.

The battery housing is divided into a battery compartment and an electrolyte compartment. A passage connecting the two compartments is closed by a frangible diaphragm. To activate the battery, the diaphragm is perforated and the electrolyte is transferred into the battery compartment through the connecting passage. For more efficient and faster transfer of electrolyte, means are provided within the electrolyte compartment to apply positive pressure on the electrolyte and to thereby force it into the battery compartment. Such means include a movable partition mounted within the electrolyte compartment. In one preferred embodiment, the movable partition is in the shape of a compressible cup mounted with the open end facing the aperture closed by the frangible diaphragm. The electrolyte is placed within the cup and a means is provided for breaking the diaphragm when activation of the battery is desired. The remaining space within the electrolyte compartment, outside the compressible cup, is filled with a gas under a predetermined amount of pressure. The gas is under sufficiently high pressure so that the pressure of the gas, upon the breaking of the diaphragm, compresses the cup and forces the electrolyte through the open passage into the battery compartment.

One of the problems with the prior art activation schemes was that the vapor pressure of the electrolyte solvent, which varies with temperature, interfered with the operation of the activation mechanism and required a relatively high pressure to overcome this vapor pressure during the activation of the battery. It was discovered that by placing a small quantity of the electrolyte solvent on the opposite side of the activation cup, the vapor pressure of the solvent is equalized, cancelling the effect of the electrolyte vapor pressure on activation time. Incorporation of this innovation in the batteries has resulted in substantial improvement of the battery activation pressure and time.

An object of the present invention is, therefore, to provide an improved activation mechanism for deferred action batteries.

A more specific object of the present invention is to provide a means for rapid activation of a reserve battery, thus making it possible to maintain the battery in non-activated state until just prior to use.

Another object of the present invention is to compensate for the effect of the electrolyte vapor pressure on the activation time of the battery.

These and further objects will become apparent to those skilled in the art of batteries upon examination of the following specification, claims, and the drawing.

DESCRIPTION OF THE PREFERRED EMBODIMENTS

Figure 1:
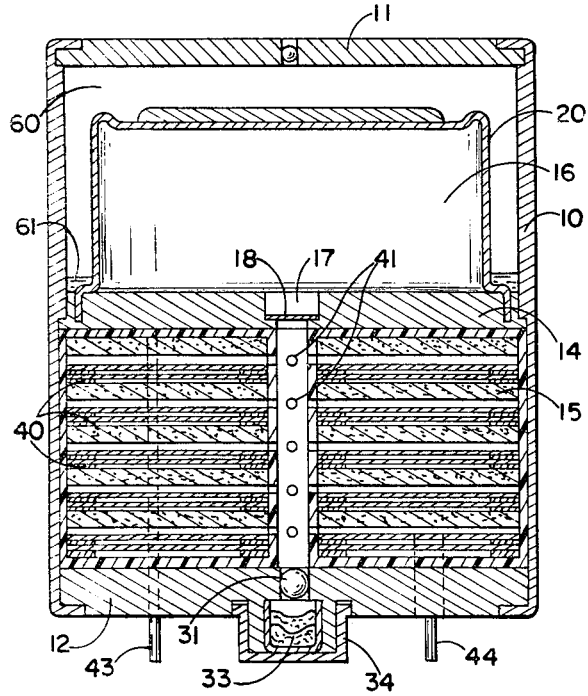
FIG. 1 is a vertical cross-section of a deferred-action battery according to the present invention, prior to activation.

Referring now to FIG. 1 of the drawing, a reserve activated battery is shown having a hermetically sealed housing with a cylindrical shell 10. Shell 10 is constructed of material which is sufficiently strong to withstand the pressures generated inside the battery. A cover member 11 closes the upper end of the cylindrical shell 10. The bottom end of the housing is closed by a terminal plate 12 which carries the battery terminals and provides means for electrical connection from inside to the outside of the battery housing. A bulkhead 14 separates the cylindrical housing into two compartments, a battery compartment 15 and a liquid storage compartment 16. Bulkhead 14 has a central aperture 17, providing a passage between liquid storage compartment 16 and battery compartment 15. A diaphragm 18 is positioned within aperture 17 to close the passage until activation of the battery is desired. Diaphragm 18 is constructed of frangible material, such as glass, so that it can be perforated by impact.

A compressible reservoir cup 20 is mounted within the liquid storage compartment 16. Cup 20 is mounted with its open end against bulkhead 14, such that upon compression of cup 20 the only path open to the liquid flow is through passage 17 into the battery compartment 15.

Battery compartment 15 contains a plurality of battery cells 40. The cells are arranged around the central column which is coaxial with the cylindrical shell 10 and which extends the entire height of the battery compartment 15. The central column has a bore extending the entire length of the battery compartment 15, from passage 17 in bulkhead 14 to terminal plate 12. A plurality of apertures 41 are provided from the central column into the individual cells of the battery. The liquid is thus allowed to flow from compartment 16 into cells 40 via passage 17, the bore in the central column, and apertures 41.

Terminal plate 12 carries positive and negative terminals 43 and 44. Cells 40 are arranged in a series configuration, forming a cell stack. Terminal 43 is connected by means of a conductor to the upper end of the cell stack, while terminal 44 is connected to the lower end of the cell stack.

Located centrally on terminal plate 12 and in line with the bore in the central column is a second bore whose diameter is somewhat smaller than the diameter of the bore in the central column. Pressed into bore 30 is a ball 31 constructed of heavy materials such as, for example, stainless steel. The diameter of ball 31 is just slightly larger than the diameter of bore 30, so that the fit is very tight and the ball will normally be held in place unless it is pushed with substantial force. The position of ball 31 is in direct line with frangible diaphragm 18 in bulkhead 14 at the opposite end of the central column.

Behind ball 31, on the side away from frangible diaphragm 18, terminal plate 12 provides an enclosure for a small quantity of explosive 33. A cap 34 covers the explosive compartment to hold explosive 33 in place. The explosive 33 in the preferred embodiment is of percussion type, which is initiated by mechanical impact against cap 34. Quite clearly, other methods of initiating the explosive can be used, such as for example, electrical initiation.

A liquid electrolyte is stored within cup 20. The remainder of the electrolyte compartment 16, outside of cup 20, is filled with a gas 60 under pressure. An inert gas, such as argon, is preferred for this purpose to avoid possible reactions between the gas and the elements of the battery with which it may come into contact. The gas pressure is sufficiently high so that, upon breaking of diaphragm 18, cup 20 is collapsed under pressure and the electrolyte within cup 20 is forced through passage 17 into battery compartment 15. A small quantity of liquid electrolyte solvent is also placed in the space outside of cup 20 at 61. The purpose of this electrolyte solvent is to offset the effect of the electrolyte vapor pressure upon the activation of the battery. The vapor pressure of the electrolyte varies with temperature and acts against the pressure of the gas needed to compress cup 20. The small quantity of electrolyte solvent 61 placed within the space outside of cup 20 serves as a compensating temperature tracking gas. It has been discovered that using this technique lower activating pressures are required, making quicker activation possible and substantially decreasing the dependence of activation time on temperature.

Figure 2:
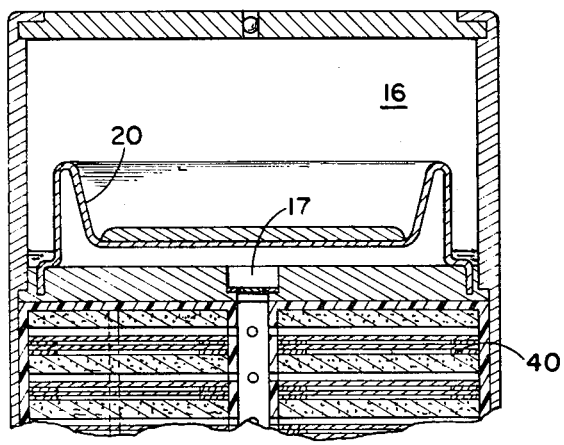
FIG. 2 is a cross-sectional view of a battery in FIG. 1, after activation.

FIG. 2 illustrates the embodiment of FIG. 1 after activation. The cup 20 is compressed and the electrolyte is displaced into battery compartment 15.

Figure 3:
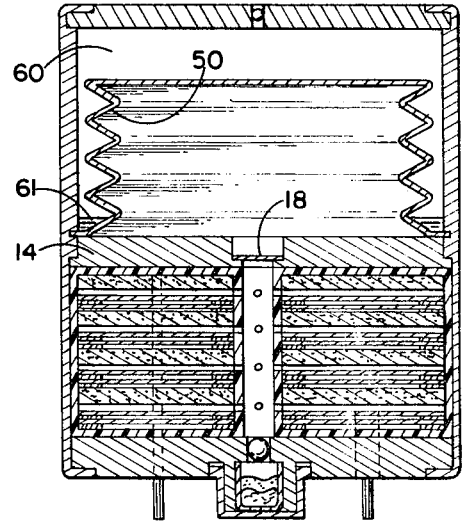
FIG. 3 is a cross-section of an alternate embodiment of a deferred-action battery according to the present invention.
Figure 4:
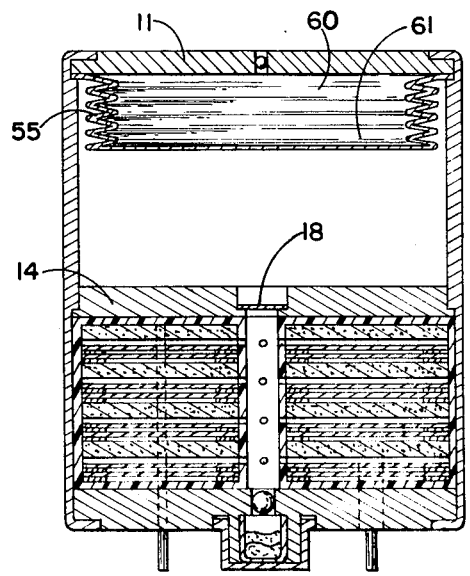
FIG. 4 illustrates a cross-section of yet another embodiment of the present invention.

FIGS. 3 and 4 illustrate alternate embodiments wherein the movable partition within the electrolyte compartment 16 is in the form of a bellows. In FIG. 3 bellows 50 is mounted in the manner similar to cup 20 of FIG. 1. Prior to activation the bellows is in expanded form and the open end is mounted facing bulkhead 14. Activation is accomplished by breaking diaphragm 18 and compressing bellows 50. A gas 60 under pressure is filled in the spaces outside of the bellows. A small amount of the electrolyte liquid solvent 61 is also positioned outside of the bellows to provide the compensating temperature tracking capability.

In FIG. 4 the position of the bellows is reversed. Instead of being mounted facing the bulkhead, the open end of the cup is attached to cover 11. Before activation, the bellows 55 is compressed and the electrolye is placed in the space outside of bellows 55. Inside the bellows is a gas 60 under pressure together with a small amount of the electrolyte solvent 61 to provide the compensating temperature tracking capability.

FIGS. 1 through 4 illustrate a number of different ways of dividing the electrolyte compartment by means of a movable partition into a reservoir for the electrolyte and a space for containing gas under pressure to act on the movable partition. Clearly, other arrangements to accomplish this function are possible and the present invention is applicable to all such various arrangements.

OPERATION

A battery of the type disclosed herein is intended for use as a reserve source of power. Its main advantage is that is does not significantly deteriorate with time while it is not in use and may be allowed to stand, prior to activation, for long periods of time, without significantly degrading the battery operation. When the need for electric power arises, the battery may be activated almost instantaneously. The operation of the invention can be most readily understood by referring to the drawings illustrating the preferred embodiments of the invention.

The activation and operation of the battery shown in FIG. 1 is accomplished as follows. An application of a sharp impact, such as by a firing pin, on the central portion of cap 34 causes detonation of explosive 33. The explosion results in a considerable amount of pressure behind ball 31. When the pressure exceeds the friction force holding the ball in the bore, the ball is ejected from bore 30, travels through the central column in the battery compartment and strikes frangible diaphragm 18, causing it to fracture. The breaking of diaphragm 18 opens passage 17 from electrolyte compartment 16 into battery compartment 15, allowing the electrolyte to flow into the battery compartment. The breaking of diaphragm 18 also results in a decrease in pressure within compressible cup 20. The pressure of gas 60, outside of compressible cup 20, now exceeds the back pressure of the electrolyte, resulting in compression of cup 20 thus forcing the electrolyte into the battery compartment 15. The back pressure due to the vapor pressure of the electrolyte is cancelled by the small amount of liquid electrolyte solvent 61 which is also placed in the space outside of collapsible cup 20. This results in significant reduction in the activation time of the battery and further significantly reduces the dependence of activation on temperature. FIG. 2 illustrates in cross-section the apparatus of FIG. 1 after completion of battery activation.

A specific example where the present invention has been used to advantage is in reserve ammonia batteries. Liquid ammonia, which is used as the electrolyte solvent, has a relatively high vapor pressure. For example, at plus 74° C. vapor pressure of liquid ammonia is approximately 520 p.s.i. Such high vapor pressures normally have had major effect on battery activation time. A performance study has been made of reserve ammonia battery of the type shown in FIG. 3, having flowing characteristics:

Voltage _____ 28 v. nominal.
Current _____ 200 ma. at 24 v.—MRV.
Life _____ 200 seconds.
Size _____ 2.0" diameter, 2.0" length.

By injecting a small quantity of ammonia into the pressurized activating chamber (enough to maintain ammonia vapor pressure after activation at +165° F.), it has been found that the main ammonia chamber pressure will "track" over the temperature range and only a small differential pressure of inert gas (argon) is required to operate the bellows once the ballistic opens the diaphragm. This is the key to operation over the temperature range without excessive preactivation internal battery pressure. Ballistic methods of diaphragm perforation combined with the pressurized bellows technique provides rapid activation and very small activation time variation over the entire temperature range. Tests conducted on seven units gave the following results:

| Unit Number: | Temperature, °F. | Time required for the cell to reach 24 volts, msec. |
|---|---|---|
| 1 | +200 | 28 |
| 2 | −65 | 25 |
| 3 | −65 | 28 |
| 4 | +200 | 28 |
| 5 | −65 | 25 |
| 6 | +200 | 25 |
| 7 | −65 | 96 |

Units 1 through 6 were activated under "no load" conditions, while unit 7 was activated under a 120 ohm load. This explains the longer activation time required for unit 7. Activation times of similar batteries prior to incorporation of the present invention have typically varied from 100 to 500 msec. The present invention, as demonstrated above, has cut the activation time to about 25 msec. In many applications, such as in munition, the speed of activation is critical.

The operation of the apparatus of FIG. 3 is similar to that of FIGS. 1 and 2. The cup in the shape of a bellows 50 is compressed by gas 60 to displace electrolyte into battery compartment 15.

The apparatus of FIG. 4 is different only in that the pressure on the liquid electrolyte is transmitted through an expanding cup shaped bellows 55.

The means for breaking diaphragm 18 are shown in the form of an explosively propelled metal ball 31. However, clearly other means could be provided for this purpose without departing from the spirit of the invention.

I claim:

1. In a reserve activated battery wherein prior to activation the electrolyte solvent is maintained in an activator compartment separate from a battery cell compartment by a frangible barrier and means are provided for rupturing said frangible barrier when activation of the battery is desired, an improved means for transferring the electrolyte solvent from the activator compartment into the battery cell compartment, said improved means comprising:

a movable partition mounted in said activator compartment, dividing it into a first segment containing a liquid electrolyte solvent adjacent said frangible barrier and a second segment separated from said electrolyte solvent and said frangible wall by said movable partition, said second segment containing a gas under a pressure such that upon rupture of said frangible barrier the gas pressure exerts sufficient force on said movable partition to force said electrolyte solvent into said battery compartment, said second segment further containing a small quantity of said liquid electrolyte solvent, whereby the vapor pressure of said electrolyte solvent acting on the movable partition within the first segment is balanced by an equal vapor pressure of the electrolyte solvent within said second segment at temperature up to 200° F. thereby cancelling the effect of the electrolyte vapor pressure on the activation time of the battery throughout a wide temperature range whereby the total pressure in the second segment exceeds the pressure in the first segment.

2. Apparatus according to claim 1 wherein said electrolyte solvent is liquid ammonia.

3. Apparatus according to claim 1 wherein said gas under pressure within said second segment of the activator compartment is an inert gas.

4. Apparatus according to claim 1 wherein said gas under pressure within said second segment of the activator compartment is argon.

5. Apparatus according to claim 3 wherein said electrolyte includes liquid ammonia.

6. Apparatus according to claim 1, wherein said movable partition is in the form of a bellows.

7. Apparatus according to claim 1 wherein said movable barrier is in the form of a collapsible cup having its open end attached within said activator compartment such that it encloses said frangible barrier and transfer of electrolyte into battery cell compartment is accomplished by compression of the cup.

8. Apparatus according to claim 1 wherein said movable partition is in the form of an expandable cup having its open end attached within said activator compartment against a portion of the wall not including said frangible barrier, whereby during activation of the battery the electrolyte is forced into the battery by expansion of the cup.

9. Apparatus according to claim 1 wherein means is provided for breaking said frangible barrier by explosively propelling a projectile into said frangible barrier.

10. Apparatus according to claim 9 wherein said farngible barrier is constructed of glass.

References Cited
UNITED STATES PATENTS

| 3,445,295 | 5/1969 | Smith et al. | 136—90 |
| 3,298,868 | 1/1967 | Smith et al. | 136—114 |
| 3,582,405 | 6/1971 | Jerabek et al. | 136—114 |
| 3,514,339 | 5/1970 | Powers | 136—113 |
| 3,470,029 | 9/1969 | Meyers et al. | 136—114 |
| 2,847,494 | 8/1958 | Jeannin | 136—114 |

WINSTON A. DOUGLAS, Primary Examiner

C. F. LEFEVOUR, Assistant Examiner

U.S. Cl. X.R.

136—90